Patented Nov. 27, 1934

1,982,385

UNITED STATES PATENT OFFICE 1,982,385

COMPOSITE POROUS AND MICRO-POROUS ARTICLES

Ernst Alfred Hauser, Wimpassing I. Schwte, Austria, assignor to Kaysam Syndicate Limited, London, England, a British company No Drawing. Application November 23, 1933, Serial No. 699,409. In Germany December 1, 1932

12 Claims. (Cl. 18—53)

This invention relates to the production of articles from aqueous rubber dispersions.

The principal object of the invention is to produce articles in a single piece having parts that are microporous and parts that are non-porous. A further object of the invention is to produce hard rubber articles such as filters for rayon solutions having integral unions.

It is already known to cause aqueous rubber dispersions to set in moulds either with or without the application of heat to give a microporous gel in which the liquid content of the rubber dispersion is contained in the pores. The essential feature which determines such gel formation is the addition of a substance or substances to the latex, which may contain vulcanizing agents and accelerators, fillers and like additions which are usually made, which bring the pH value of the mix within a certain range. This range is identical with the gap in the pH values of latex and a mix having a pH value within this range sets as a whole without synæresis or agglomeration to give a plastic non-elastic coherent gel.

According to the present invention this gel is treated after removal from the mould so that some parts of it remain microporous while the remaining parts are rendered non-porous. An article is first produced having the required shape by the known process of causing a sensitized mix to set in a mould of the appropriate shape. The gel is then withdrawn from the mould and may be washed. Those parts of it which are to be made non-porous are then dried in a manner which permits the escape of water contained in the pores, but the parts which are to remain microporous are screened from this drying action. The drying must take place very gently at first in order to prevent too rapid an escape of water from the outer layers of the article which would lead to a closing up of the pores of such outer layers, thus rendering impossible any further escape of water from the interior. After initial drying at a temperature only slightly above room temperature, the temperature may gradually be raised until the drying is complete. The dried article is then vulcanized under conditions which do not permit the escape of water from those parts of it which are to remain microporous. This can be conveniently carried out by bringing these parts into contact with water or steam during the vulcanizing process, but any suitable method may be adopted. If the original mix does not contain more than 10% sulphur with respect to the rubber content, the microporous parts of the resultant soft rubber article must be kept permanently moist as the porosity is lost irreversibly when once the parts dry out. This precaution is not necessary for articles containing more than 10% sulphur.

It may be desirable to sharpen the line of demarcation between the porous and non-porous parts. According to a further feature of the invention this result is obtained by expelling the water by pressure at the boundary zone or zones immediately after removal of the article from the mould, i. e. while the gel is still completely microporous. This expression of the water gives rise to a zone of massive rubber which can easily be distinguished. The pressure can be set up in any desired way, as by tightening a noose around it. The formation of such a zone of massive rubber between the non-porous and microporous parts of the article has the advantage of checking any capillary action between the two parts which might lead to the formation of a semi-porous intermediate zone and would render the boundary between them ill-defined, and also of rendering the boundary easily visible to the eye.

This process is suitable for the production of all forms of moulded articles and particularly for the production of filter pipes, oil filters, electrolytic diaphragms and fine-grained filters which are required in the artificial silk industry. A suitable form for such a filter designed for filtering artificial silk on its way to spinning nozzles consists of a hollow cylinder closed at its lower end, the lower part of which is made of microporous rubber and the upper half of non-porous rubber having the hardness of ebonite and provided with a screw-thread which may be either cut or moulded. It is convenient to have a slight constriction between the two portions of the cylinder where the water has been pressed out to give a zone of massive rubber along the boundary between the two portions as described above. The filter can be screwed by means of its hard upper half into any required vessel and the artificial silk solution can be forced into the interior and filtered through the pores in the lower half. If desired a filter may be made which will only filter at certain points along its length or circumference by pressing out the water from all parts which are not to be microporous before the drying process has been begun. The process may also be used to produce nozzles for use in the artificial silk industry, since pores of diameter as small as $0.2\mu$ can readily be produced.

In a preferred embodiment of this invention a mixture may be made consisting of

| | Parts |
|---|---|
| Concentrated latex sold under the registered trade-mark "Revertex" | 130 |
| Zinc carbonate | 20 |
| Powdered chalk | 35 |
| Powdered sulphur | 50 |
| Dibenzothiazyl-disulphide | 2 |
| Water | 80 |

This mix can be caused to set in about 20 minutes at room temperature by addition of a paste consisting of 5 parts magnesium oxide and 6 parts of a 2N solution of trisodium phosphate and subsequent addition to each 100 grams of the whole mixture of 10 cc. of a 38% ammonium nitrate solution. In order to produce a filter for artificial silk, this mixture is charged, immediately after addition of the setting agents, into a tubular mould consisting of a casing and a core. The casing may, if desired, be provided with a screw-thread in its upper part. When the setting has taken place the resultant plastic coherent tube is removed from the mould while being left on the core. The whole article may, if desired, be washed at this stage and after washing a noose is applied round the tube in order to express the water from the boundary between the lower part which is to be made microporous and the upper part which is to be made non-porous, a dividing zone of massive rubber being thus formed between the two parts. The lower half of the article is then inserted in water or wrapped in a moist cloth while the upper half is treated with hot air first at about 25 to 30° C. and then at a gradually increasing temperature not exceeding 40° C. until complete drying of this part has taken place. About two days may be allowed for the total time of drying if the drying process is not accelerated by means of a fan or the like. The whole is then placed in a vulcanizing oven and vulcanized at 145° C. for two hours. The lower half is kept microporous during this process by carrying out the vulcanization in the presence of moist steam or by immersion in water, and the top half is protected from the action of the steam by winding a rubberized tape round it.

I claim:—

1. In a process for the manufacture of rubber and hard rubber articles, the series of steps comprising drying parts of a microporous gel under conditions which permit the escape of water from these parts, preventing the escape of water from the remaining parts of said gel, and vulcanizing the article under conditions in which the microporosity of the undried parts is maintained.

2. In a process for the manufacture of rubber and hard rubber articles, the series of steps comprising drying parts of a microporous gel containing more than 10% sulphur on the rubber content under conditions which permit the escape of water from these parts, preventing the escape of water from the remaining parts of said gel and vulcanizing the article under conditions in which the microporosity of the undried parts is maintained.

3. In a process for the manufacture of rubber and hard rubber articles, the series of steps comprising subjecting parts of a microporous gel to gentle heating until the moisture contained in them has been expelled, contacting the remaining parts of said gel with water, wrapping an isolating material around the dried parts, and vulcanizing the article in the presence of moist steam.

4. In a process for the manufacture of rubber and hard rubber articles, in order to produce an article having clearly defined microporous and non-porous parts, the steps which comprise forming a line of division in a microporous gel between the parts which are to be made non-porous and those which are to remain microporous by expressing the water contained in this line of division in the original microporous gel by means of mechanical pressure, drying the parts on one side of said line of division under conditions which permit the escape of water from these parts, preventing the escape of water from the remaining parts of said gel, and vulcanizing the article under conditions in which the microporosity of the undried parts is maintained.

5. In a process for the manufacture of rubber and hard rubber articles in order to produce an article having clearly defined microporous and non-porous parts, the step which comprises forming a line of division in a microporous gel between the parts which are to be made non-porous and those which are to remain microporous by expressing the water contained in this line of division in the original microporous gel by means of mechanical pressure.

6. In a process as claimed in claim 5, the step which comprises applying the mechanical pressure by tightening a noose around the microporous gel.

7. The process of manufacturing rubber articles having clearly defined microporous and non-porous portions comprising the following steps; forming the article of microporous gel, drying the portions to be non-porous to remove the water therefrom while preventing the removal of the water from the other portions, and vulcanizing the entire article.

8. The process of manufacturing rubber articles having clearly defined microporous and non-porous portions comprising the following steps; forming the article of microporous gel, drying the portions to be non-porous to remove the water therefrom while preventing the removal of the water from the other portions, vulcanizing the entire article and during the step of vulcanizing keeping the microporous portions moist.

9. The process of manufacturing rubber articles having clearly defined microporous and non-porous portions comprising the following steps; forming the article of microporous gel, drying the portions to be non-porous to remove the water therefrom while preventing the removal of the water from the other portions, vulcanizing the entire article and during the step of vulcanizing keeping the microporous portions moist and isolating the dried non-porous portions from such moisture.

10. The process of manufacturing rubber articles having clearly defined microporous and non-porous portions comprising the following steps; forming the article of microporous gel, mechanically expressing the water from the gel along definite lines of division therein between the microporous and non-porous portions, drying the non-porous portions to remove the water therefrom, and vulcanizing the entire article.

11. The process of manufacturing rubber articles having clearly defined microporous and non-porous portions comprising the following steps; forming the article of microporous gel, mechanically expressing the water from the gel along definite lines of division therein between the microporous and non-porous portions, drying the non-porous portions to remove the water therefrom, vulcanizing the entire article and during the step of vulcanizing keeping the microporous portions moist.

12. The process of manufacturing rubber articles having clearly defined microporous and non-porous portions comprising the following steps; forming the article of microporous gel, mechanically expressing the water from the gel along definite lines of division therein between the microporous and non-porous portions, drying the non-porous portions to remove the water therefrom, vulcanizing the entire article and during the step of vulcanizing keeping the microporous portions moist and isolating the dried non-porous portions from such moisture.

ERNST ALFRED HAUSER.